July 4, 1967  F. STADELMAN  3,329,469

CONVEYOR MEANS

Filed May 12, 1966

INVENTOR.
*Frank Stadelman*

BY

*John G. Kovalick*

AGENT

United States Patent Office 3,329,469
Patented July 4, 1967

3,329,469
CONVEYOR MEANS
Frank Stadelman, Cranford, N.J., assignor to Latendorf Conveying Corp., Kenilworth, N.J., a corporation of New Jersey
Filed May 12, 1966, Ser. No. 549,534
3 Claims. (Cl. 302—11)

ABSTRACT OF THE DISCLOSURE

The present invention deals with a conveyor lifting means for passing conveyed articles from one conveyor to another conveyor over a space therebetween, the lifting means comprising a pneumatic manifold having a plurality of spaced ducts extending therefrom into the space between the conveyors and positioned transversally of the conveyors for passing pressurized gas upwardly between the conveyors, whereby an article is pneumatically lifted in passing over the space.

---

Figure 1:
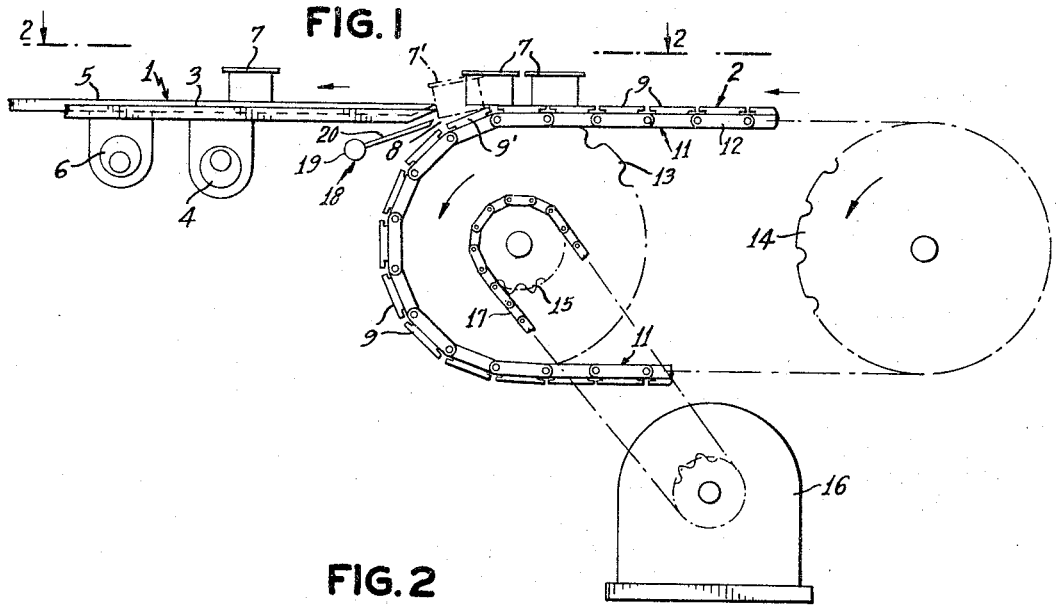

In conventional bakery practice it is known to package raw bakery dough, such as cake dough, and the like, in suitable containers prior to baking in an oven. While packaged in the containers, the dough is baked during its passage through the oven. A means for passing the containers through the oven comprises a conventional endless apron conveyor of the type hereinafter more particularly described. A second endless apron type conveyor is employed outside the oven in the effective direction of travel of the first or oven conveyor as a means for further passing the containers toward a desirable location for shipment processing. Because of the undesirable spacing between the first and second conveyors, a transfer conveyor is positioned between the first and second conveyors and also in the effective direction of travel of the oven conveyor. The transfer conveyor comprises a known walking beam type conveyor which passes the containers containing the baked product from the oven or first conveyor to the second conveyor. The transfer conveyor comprises a plurality of elongated flat bars laterally spaced from each other and longitudinally directed along the aforesaid effective direction of travel. One set of alternate bars of the plurality of bars are cam operated in unison and the other set of the other alternate bars are likewise cam operated in unison, but with the opening cam of each set being offset 180° relative to each other, whereby the alternate sets of bars reciprocate relative to each other in movement. The movement provides a "walking" effect which propels containers carried by the bars toward the second conveyor. Since the bars are substantially flat and their movement is largely translatory, it is possible to locate the ends of the transfer conveyor relatively close to both the first and second conveyors thereby usually permitting passage of the containers along the effective direction of travel.

The oven conveyor comprises an endless apron type conveyor including flat rotatably interconnected rectangular elongated plates arranged laterally adjacent each other and known as aprons. The aprons are carried by an endless chain with each of the aprons being secured, such as by welding, to a link of the chain. The width of the apron is substantially co-extensive with the length of a chain link to which it is secured. The chain of the conveyor carrying the aprons passes over a motivating sprocket located near the receiving end of the transfer conveyor with the aprons passing about the sprocket axis downwardly from the effective direction of travel. During travel, the aprons are spaced from the receiving end of the transfer conveyor and, as they each approach the effective direction of travel of the transfer conveyor, they are each downwardly angularly disposed relative to the effective direction of travel when immediately adjacent the receiving end of the transfer conveyor. Such angular disposition of the aprons at such location is not disadvantageous when the bottom of the conveyed container is dimensioned greater than the width of the oven conveyor apron, since the overhang of the container from the oven conveyor to the transfer conveyor is great enough to engage the receiving ends of the reciprocating transfer conveyor bars forwardly of the angularly disposed apron immediately adjacent the receiving end of the transfer conveyor and which is already in the desired direction of travel. However, when the bottom of the container is dimensioned less than the width of an apron, the overhang of the container is insufficient to contact an apron already in the effective direction of travel, and, therefore, the container falls onto the angularly disposed apron. In such position, the filled container is restrained from further travel and merely slides along the moving angular apron, and also along each successive angularly disposed apron immediately adjacent the receiving end of the transfer conveyor. This results in the abutting of the transfer conveyor against the sides of the containers with a blocking of the containers from passage from the oven conveyor into continuous transfer onto the transfer conveyor.

The invention is particularly directed to a combination of a pair of conveyors spaced from each other along an effective direction of travel and including means interposed substantially therebetween for lifting a container passing from one conveyor to the other over the spacing between the conveyors.

It is an object of the invention to provide a pair of conveyors spaced from each other along an effective direction of travel and including means which assures uninterrupted transfer of a container from one conveyor to the other when the bottom of the container is dimensioned less than the width of a conveyor apron.

Figure 2:
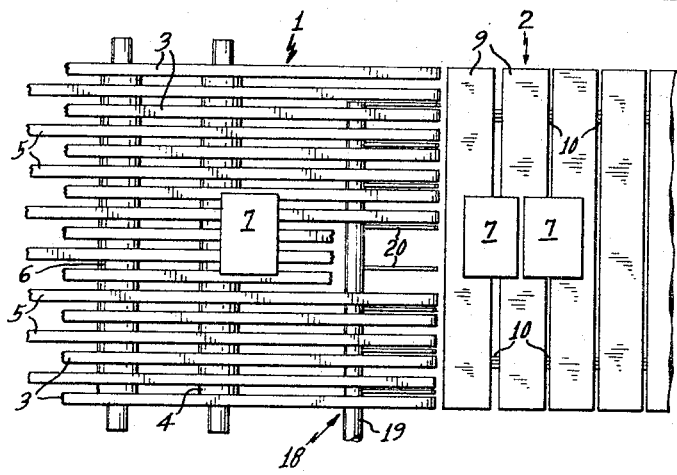
Figure 3:
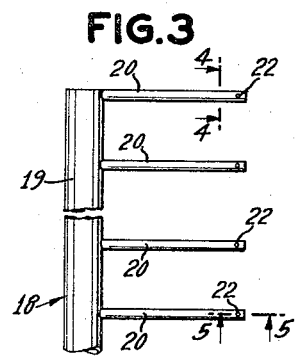
Figure 5:
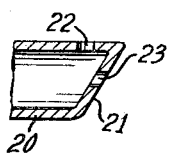
Figure 4:
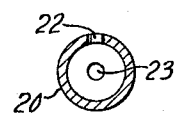
Figure 6:
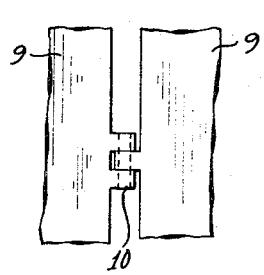

Other objects and advantages of the invention will become apparent from the description hereinafter following and the drawings forming a part hereof, in which:

FIGURE 1 is an elevational side view of a pair of conveyors including a lifting means according to the invention, FIGURE 2 is a top view along lines 2—2 of FIGURE 1, FIGURE 3 is a top fragmentary view of a component of FIGURE 1, FIGURE 4 is a cross-sectional view along lines 4—4 of FIGURE 3, FIGURE 5 is a cross-sectional view along lines 5—5 of FIGURE 3, and FIGURE 6 is an enlarged fragmentary view of a component of the invention.

Regarding the figures, the invention comprises a pair of conveyors 1 and 2 spaced from each other along an effective direction of travel indicated by arrows. The term "effective direction of travel" refers to the linear path of travel of containers passing over the conveyors in a desired direction. Conveyor 1 is illustrated as a "walking beam" type transfer conveyor comprising a plurality of elongated flat bars laterally spaced from each other and longitudinally directed in the aforesaid effective direction of travel. One set of alternate bars 3 of the plurality of bars are cam operated in unison by appropriate linkage to cam 4 shown in simple form for illustrative purposes. The other set of alternate bars 5 are likewise cam operated in unison by cam 6, with the two cams being offset 180° relative to each other as illustrated, whereby the alternate sets of bars reciprocate relative to each other to provide a "walking" effect which propels containers 7 carried by the bars toward other conveyor means (not shown). The receiving ends of the bars of conveyor 1 are spaced from conveyor 2 aas at 8.

Conveyor 2 is an endless apron type conveyor comprising flat rotatably interconnected rectangular plates 9 arranged laterally adjacent each other and known as aprons. An example of how the plates are laterally rotatably interconnected is illustrated by FIGURE 6 showing a linkage 10 which is conventional and self-evident. The aprons 9 are carried by an endless chain 11 with each of the aprons 9 being secured, such as by welding, to a link 12 of chain 11, with the width of each apron being substantially co-extensive with each link 12 to which it is secured. The chain 11 passes over a driving sprocket 13 located near the receiving end of the conveyor 1 with the aprons 9 passing about the sprocket 13 downwardly away from the effective direction of travel. During travel, the aprons 9 are spaced from the discharge end of conveyor 1, as at 8, and as they each successively approach the receiving end of conveyor 1 they are each angularly downwardly disposed at the spacing 8 immediately adjacent the receiving end of conveyor 1. When the container 7 has a bottom dimensioned less than the width of an apron 9, the overhang of the container from the conveyor 2 in passing toward container 1 is insufficient to bridge the spacing 8 while in a horizontal position and, therefore, the container falls onto the inclined or angularly disposed apron 9' immediately adjacent the receiving end of conveyor 1. As a result, the container indicated in broken lines as container 7' falls onto the angularly disposed apron 9'. In this position the container is restrained from further travel and merely slides along the apron with its sides abutting conveyor 1 and thereby stopping passage of the container onto the conveyor 1.

The chain 11 of conveyor 2 is endlessly carried by sprocket 14 and by motivating sprocket 13 carrying a coaxial gear 15 connected to a suitable motor 16 by means of the motor chain 17.

In order to overcome the above-described disadvantage, there is provided a pneumatic lifting means 18 in combination with the two conveyors 1 and 2. The pneumatic lifting means 18 is preferably in the form of a manifold having an elongated main gas or air inlet conduit 19 and extending laterally therefrom in a common direction a plurality of ducts 20 spaced from each other longitudinally of the inlet conduit and co-extensive relative to each other.

The pneumatic manifold is more particularly illustrated by FIGURES 3, 4 and 5. The end of each duct 20 terminates in a bevelled face 21, as shown by FIGURE 5. An upwardly directed opening or aperture 22 is formed through the wall of each of the ducts 20 substantially adjacent the terminal ends of the ducts. Additionally, a second aperture 23 may be formed through the bevelled terminal face 21.

As illustrated by FIGURES 1 and 2, the pneumatic lifting means or manifold 18 may be mounted by any suitable mounting means preferably beneath the reciprocating bars 3 and 5 with the ducts 20 spaced transversally of the bars and the terminal ends thereof being located in the space 8 between the conveyors 1 and 2. At such location the bevelled faces 21 are substantially closely adjacent the angularly disposed apron 9' with the apertures 23 directed toward the apron 9' and the upwardly directed apertures 22 are closely adjacent the discharge ends of the bars 3 and 5 of conveyor 1. While both apertures 22 and 23 may be employed, either one may be eliminated but, preferably, in such case, aperture 22 is especially effective as hereinafter more particularly described.

In operation, a source of pressurized gas, e.g. air, is secured to the inlet conduit 19 of manifold 18. When both conveyors 1 and 2 are motivated, the containers 7 are carried from an oven by conveyor 2. When a container approaches the receiving ends of the bars 3 and 5, and as the aprons 9 pass downwardly about sprocket 13 adjacent the receiving ends of conveyor 1, a stream of gas is caused to issue from the apertures 22 upwardly against the sides of containers 7, whereby the issuing pressurized gas exerts a lifting force against the container preventing the container from dropping downwardly into the space 8 between the conveyors as illustrated by container 7'. When both apertures 22 and 23 are employed, aperture 23 causes an issuing stream of gas to pass between the container bottom and the apron 9'. However, aperture 22 alone is sufficient in most instances to lift one end of the container 7 from contact with apron 9' and to maintain the container in a substantially horizontal position so that subsequently moving containers being discharged from conveyor 2 force the pneumatically lifted container forwardly into the effective direction of travel.

Various modifications of the invention are contemplated within the scope of the appended claims.

What is claimed is:

1. Conveyor lifting means for passing conveyed articles from one conveyor to another conveyor, comprising two conveyors aligned end-to-end for the passage of articles from one to the other in a forward direction of travel, one conveyor having an article discharge end and the other an article receiving end portion, a space between the receiving end portion and the said discharge end along the said forward direction of travel, pneumatic lifting means, comprising a pneumatic manifold having an elongated inlet conduit extending transversally of said one conveyor substantially adjacent the said discharge end, a plurality of duct means extending laterally of the inlet conduit and spaced from each other longitudinally of the inlet conduit, each duct means having a terminal end portion extending into said space between the conveyors, the terminal end portion having an opening directed upwardly for passing a pressurized gas upwardly adjacent said article discharge end of said one conveyor, whereby an article is pneumatically lifted in passing over said space.

2. A conveyor lifting means according to claim 1, comprising another opening in said terminal end portion directed toward said article receiving end portion of said other conveyor.

3. A conveyor lifting means according to claim 1, wherein said other conveyor is an endless conveyor.

References Cited

UNITED STATES PATENTS 3,187,873   6/1965   Wolff _____ 198—102
3,260,347   7/1966   Barnes _____ 198—33

ANDRES H. NIELSEN, *Primary Examiner.*